June 10, 1969 S. A. M. NORDSTROM 3,448,842
CONTROL SYSTEM FOR MOTOR VEHICLE CLUTCHES
Filed Feb. 13, 1967 Sheet 1 of 4
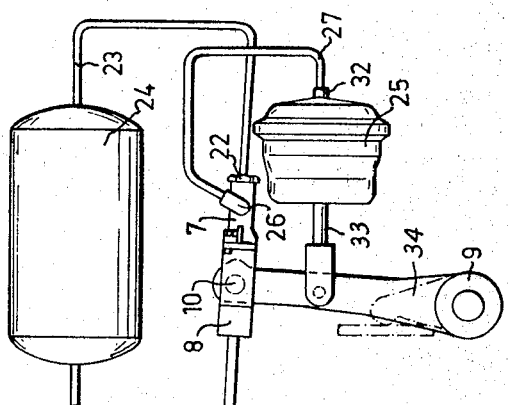
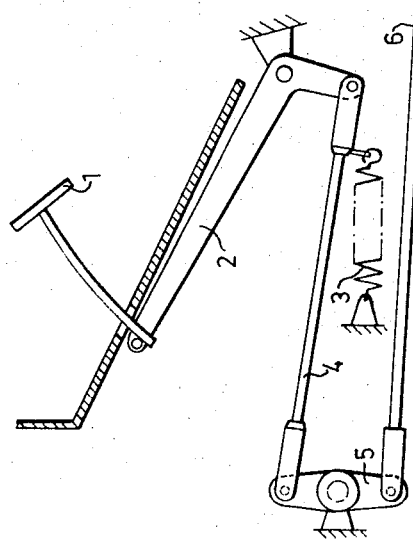
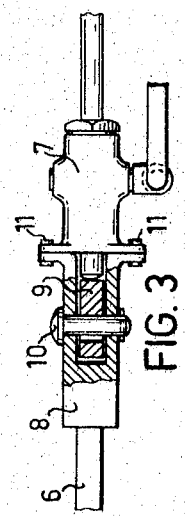
INVENTOR.
Sigurd Andrew Mauritz Nordstrom
BY
Pierce, Scheffler & Parker
Attorneys

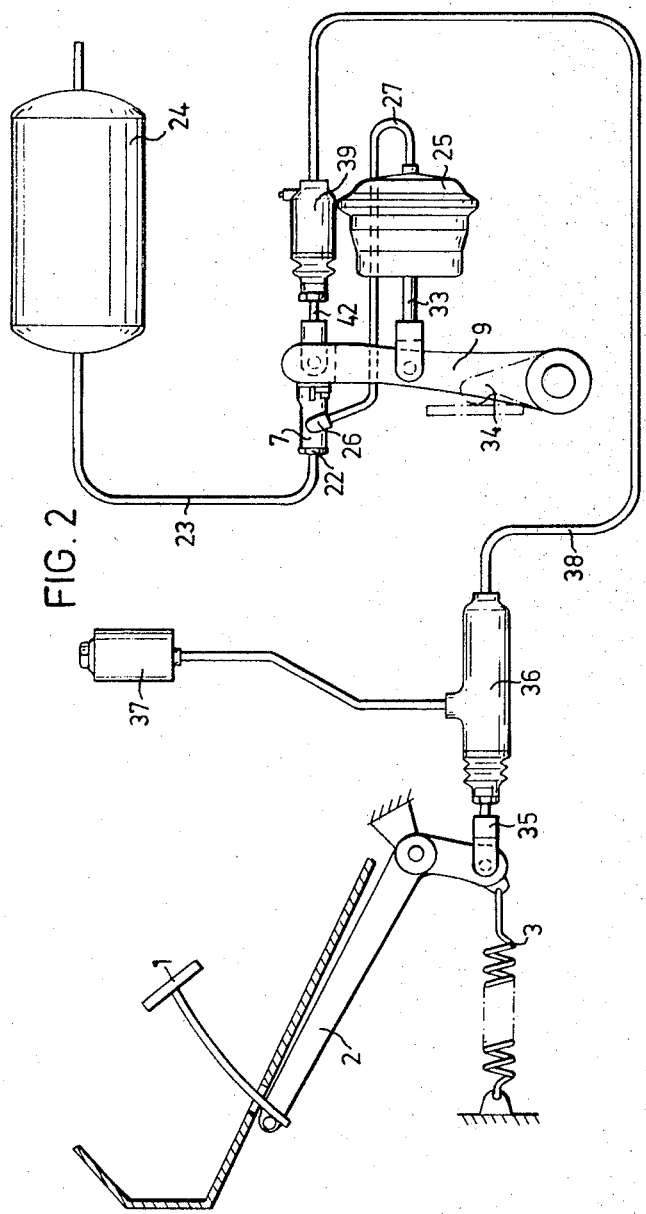
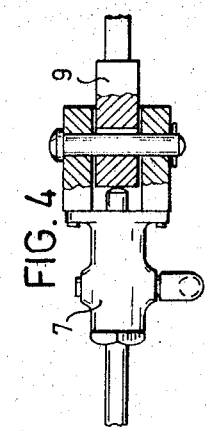

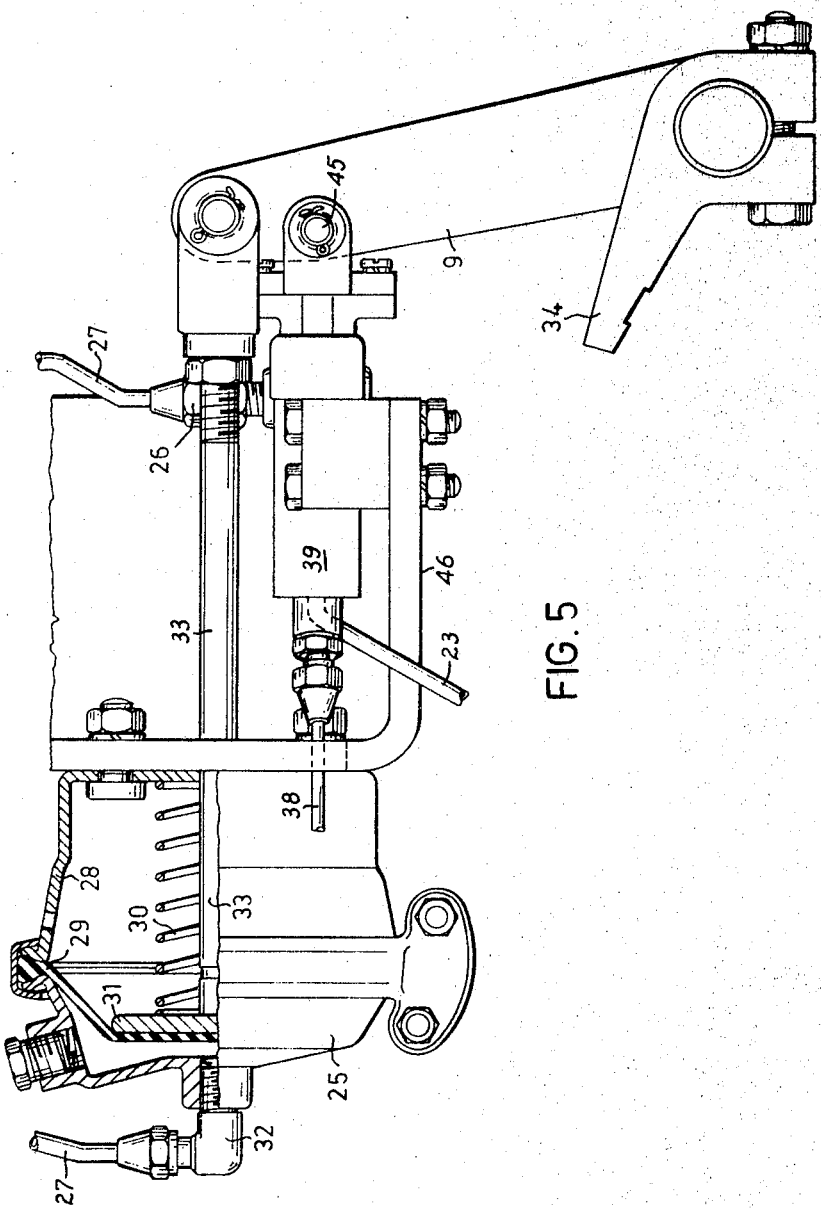

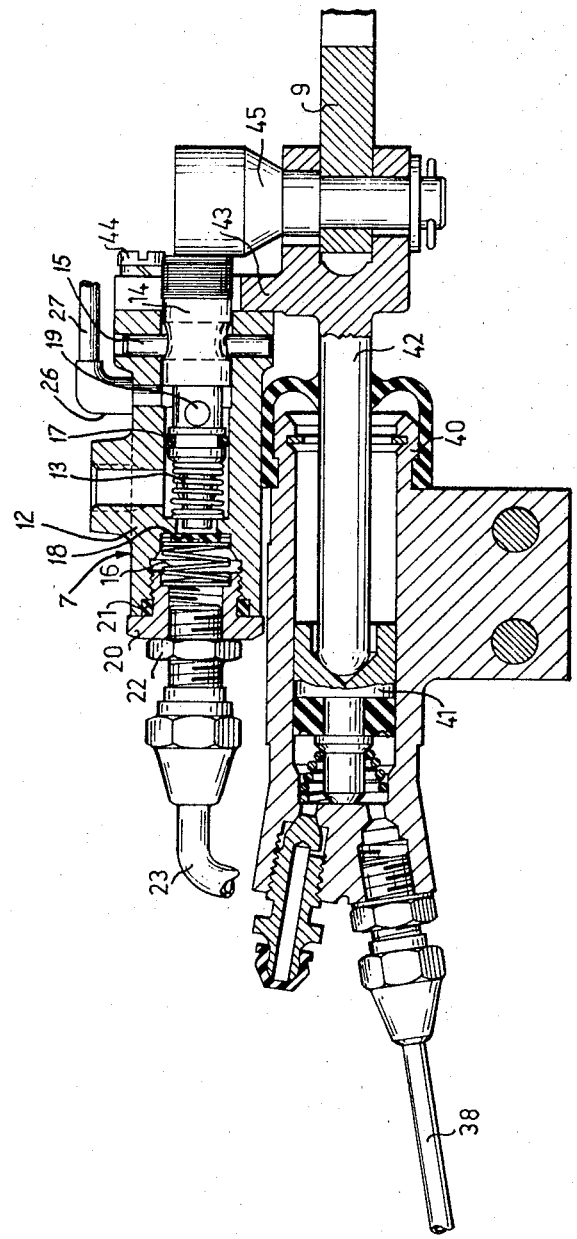

United States Patent Office 3,448,842
Patented June 10, 1969

3,448,842
CONTROL SYSTEM FOR MOTOR VEHICLE
CLUTCHES
Sigurd Andrew Mauritz Nordstrom, Sodertalje, Sweden,
assignor to Aktiebolaget Scania-Vabis, Sodertalje,
Sweden, a corporation of Sweden
Filed Feb. 13, 1967, Ser. No. 615,452
Claims priority, application Sweden, Feb. 17, 1966,
2,042/66
Int. Cl. F16d *13/44, 25/00, 19/00*
U.S. Cl. 192—91                           4 Claims

ABSTRACT OF THE DISCLOSURE

A control system for motor vehicle clutches including a clutch pedal connected with a two-way valve controlling the air flow to a pneumatic clutch releasing servo motor. The valve and the control rod of the servo motor are both connected through a connecting joint to the disengagement arm of the clutch. The connecting joint provides for a lost-motion resulting in a limited relative movement of the members of said joint so as to energize, under normal conditions, the servo motor before the disengagement arm be actuated by the pedal when depressing the same for clutch release.

---

The present invention relates to control systems for motor vehicle clutches which are operated by means of a clutch pedal or the like. The pedal movement is transmitted through known transmission means to a valve for controlling its function as a control member for the air flow to and from a pneumatic servo motor which is provided to perform the actual clutch disengagement work under normal conditions.

Auxiliary means for said purpose are particularly necessary when transmitting a relatively great torque from the engine to the gear box of the vehicle because the spring forces which are then utilized to hold the clutch engaged between the units under consideration are so great that the driver when employing merely mechanical transmission means from the pedal to the clutch has to perform a too tiring disengagement work.

For reducing the disengagement work it is known to actuate the clutch pedal by means of a spring in such a manner that the depression of the pedal from a resting position to a dead point position or neutral position is effected against the spring action of whereas the following depression of the pedal to a bottom or final position is effected in cooperation with assistance from said spring in order to facilitate this portion of the depression of the pedal. In spite of this the disengagement work required by the driver will be highly tiring.

In order to obtain a more substantial reduction of the required disengagement work to be done by the driver it is therefore common practice to utilize some kind of servo motor, the transmission of the movement from the pedal for controlling the servo motor being normally effected through the intermediary of a hydraulic system. The pedal force to be effected by the driver upon employing such a means is dependent on the balance between the air pressure occurring in the servo system and the counteracting hydraulic pressure. For cylinder diameters of for instance 3 cm. and with an air pressure of 6–7 kg./cm.$^2$, the total counter pressure must be at least 42 kg. which, through a pedal gearing of for instance 1:3, requires a pedal pressure of about 14 kg. which, however, with respect to the actual friction in joints and the like may be estimated at a minimum of 16 kg. The pedal travel in such devices adapted for engine powers just above 200 HP is then often of the order of 18–20 cm.

However, the increasing power of modern truck engines requires stronger clutches than hitherto used which will result in a pedal power of about 25 kg., and the required pedal travel will then have a rather normal value of 22 cm. which value will not form any unusual or upper limit when employing the above said auxiliary means for disengagement.

A reduction of the required pedal force at the expense of maintained pedal travel and increased servo action has shown to be difficult to carry out practically. Such a device requires a greater main cylinder in the hydraulic system which is difficult to place into the driving unit and which is relatively expensive. Furthermore, such a device would highly complicate the required equipment for the intermediary means from the pedal to the clutch.

The present invention has for its object to secure a clutch function which by means of a foot pedal controlled system enables a complete adaption to desired values of the pedal power as well as the pedal travel independent of what transmission capacity the clutch is constructed for. With respect to this, the control system according to the invention is based on the fact that the pedal movement through known mechanical or hydraulic transmission means actuates a valve and controls its function as a control means for the air flow to and from a servo motor which is provided to carry out the actual clutch disengagement work under normal conditions.

Such control systems are hitherto known but due to the fact that they as a rule are too complicated they have not become practically utilized for motor vehicle clutches. The reasons for this may, besides the relatively high cost for known control systems, depend on difficulties to obtain a functional security for the same. A control system which is merely operated by means of a servo action is too unsafe to be employed for carrying out the required disengagement work. This holds especially true in connection with the first start of a vehicle when the vehicle has been standing still for a longer period.

However, in known control systems it is theoretically possible to obtain a manual disengagement by depressing a foot pedal which, in the construction under consideration, is formed by the outer free end of a piston rod for a valve controlling the air flow to and from the servo motor. Such a construction, however, is difficult to realize because it is too limited for a certain type of motor vehicle. In this respect the pedal travel seems to be limited by given lengths for connecting conduits and due to this fact it seems to be difficult alternatively to employ such a system in busses and trucks of various kinds equipped with a fixed or pivotable driver's cab.

The present invention enables a double control of the clutch, and members included in the control system are connected as a unit in a simple manner to the chassis of a vehicle, the mounting of the compact upnit of disengagement means according to the invention being independent of the vehicle type as well as of the disposition of the engine and the clutch. To obtain this objective the invention is characterized in that a two-way valve and a control rod for a servo motor are both connected to the disengagement arm of the clutch of the vehicle, and in that in the connecting joint between the disengagement arm and two-way valve is provided an adjustable play in the direction of movement which will permit a mutual relative lost motion for the last mentioned members, the valve function being then actuated to enable the energizing of the servo motor before the disengagement arm is actuated by the pedal movement.

In the control system according to the invention the equipment is given a considerably simple form, and its few numbers of components and transmission members reduces the risk of deformation for the system as a whole. The main cylinder in the alternative hydraulic system may, in relation to the conventional type of disengagement means, be reduced as to its size which favourably influences the total cost for the clutch means required.

Functionally seen, the invention enables considerable advantages. The working control pressure on the clutch pedal may be selected for any power from 3 kg. which later corresponds to the required power to overcome the engagement of the valve. Further, the pedal travel may be adapted to any length desired which results in the advantage that the driver of the vehicle may operate the vehicle clutch merely by tilting his foot with his heel resting on the floor of the driver's cab.

In the event that the servo motor should be inoperative the disengagement must be carried out merely manually. By means of the control system according to the invention this is also possible, the driver then being forced to temporarily effect a pressure on the pedal of about 40–50 kg. in order to obtain disengagement. Such an operation may be considered as an emergency, and the construction of the control system in order to enable such a disengagement will in practice function merely as a functional safety measure in order to provide for a possibility of disengagement under all conditions.

With respect to the control of the pedal movement on the two-way valve, the control sysem according o the invention is characterized in that a valve rod displaceably journalled in the valve housing of the two-way valve is provided to merely be actuated by the relative movement of the two-way valve and the disengagement arm, respectively, and to control in a manner known per se the air flow to and from the servo motor, the lost motion or play in the connecting joint balancing the movements of the disengagement arm as a function of the pedal travel.

The opening and closing of the valve function is accordingly controlled by the pedal movement without counteraction of those spring forces holding the clutch engaged. The pedal movement may be transmitted to the two-way valve either purely mechanically or hydraulically, which in the last mentioned case is effected through a main cylinder and a working cylinder.

The play in the connecting joint between the valve and the disengagement arm must, however, always be so great or in other words be so adjusted that the lost motion in the connecting joint will compensate for the actual play in the valve, the valve having an outlet which is connected to the surrounding atmosphere and is closed under the condition referred to above. Further, the lost motion enables that upon further movement of the pedal and the valve rod a connection in the valve will be opened to an air pressure container, the servo motor then being engaged to perform the actual disengagement work.

The play in the connecting joint as described above further has another important function. If the disengagement arm under the influence of the servo force obtains a too rapid reaction and so to say runs ahead of the pedal travel, the so called play in the connecting joint will return to the starting position, and the outlet of the valve will again be opened so that the air flow from the air pressure container will be reduced. In such a manner the play in the connecting joint will balance the movements of the disengagement arm as a function of the pedal travel to form a kind of synchronizing function.

These and other characteristics of the invention and the advantages derived therefrom will be explained more in detail in the following description of some embodiments of the invention shown by way of example in the annexed drawings.

FIGS. 1 and 2 show diagrammatically two embodiments of the control system having a mechanical and hydraulic transimssion, respectively, between the pedal and the valve.

FIGS. 3 and 4 show on an enlarged scale the connection of the two-way valve to the disengagement arm in the alternative embodiments to FIGS. 1 and 2, respectively.

FIG. 5 illustrates in a plan view the mounting of the various cooperating components on a bracket, and FIG. 6 shows a section of the valve in FIG. 5 for illustrating the internal construction of the valve and the working cylinder.

A clutch pedal 1 is secured to a pedal arm 2 pivotally mounted in the frame of the vehicle. Depression of the pedal to rotate the pedal arm is counteracted by a tension spring 3 extending between the frame of the vehicle and the pedal arm 2. A link 4 is pivotally connected to the pedal arm 2 in the control system according to FIG. 1. By means of the link 4 the movement of the pedal is transmitted to a two-armed rocker 5 pivotally mounted in the frame of the vehicle. The link 4 is pivotally connected to one of the arms of the rocker 5, whereas the other arm of the rocker is pivotally connected to a link 6 which in turn transmits the movement to a two-way valve 7. As to the last mentioned transmission the link 6 is at its outer end provided with a fork-shaped guide 8 the legs of which enclose the disengagement arm 9 and connect the link 6 to the same by means of a pin 10 passing through the legs of the fork and through the disengagement arm 9. Said connection is so constructed that the hole for the pin 10 in the legs of the guide 8 or in the disengagement arm 9 will permit partial movement for the link connection in relation to the engagement arm 9. Such a lost motion will in the following be referred to as a "play" and in the device according to FIG. 1 the play has been obtained by having a greater play in the hole in the disengagement arm 9 than in the legs of the guide 8. Said play is of substantial importance for the control system according to the invention which will be disclosed more in detail in the following description.

The guide 8 is further provided with two ears at the ends of its legs which by means of rivets or screws 11 support the two-way valve 7 which is adapted to follow the control movements for the clutch function. The two way valve 7 is of known construction but since the valve function in the control system according to the invention is provided to control the clutch function the characteristic features of such valve will be explained briefly with reference to the section shown in FIG. 6.

In valve housing 12 a displaceable valve rod 14 is biased by a compression spring 13 disposed between the valve rod 14 and an abutment in the through-flow channel in the housing. The valve rod 14 is adapted to regulate the valve function. The valve rod 14 may perform axial displacement movements which are limited by a guide pin 15 secured in the valve housing 12. This pin passes through a rather big hole running diametrically through the rod 14.

One end of the valve rod 14 extends outside the valve housing 12 and its other end is, in the outer end position of the rod 14, provided to take a free position in relation to a sealing washer 18. This washer is formed of rubber and is pressed by compression spring 16 to engagement with the other side of the above mentioned abutment in the through-flow channel of the valve housing 12 and will thereby block its air connection.

The other end of the spring 16 will rest against a nut 20 screwed into the valve housing 12. This nut is by means of a sealing 21 sealed against the valve housing 12 and in the central bore of the nut is secured a nipple 22 for an air conduit 23 from an air pressure container 24.

The valve rod 14 is provided with a sealing ring 17 for sealing against the bore forming the through-flow channel. An intermediate chamber defined between the sealing washer 18 and the sealing ring 17 in the valve housing 12 is in the outer end position of the valve rod 14 in connection with the surrounding atmosphere due to the fact that the valve rod 14 is formed with an axially central bore extending from its inner end to a diametrical outlet hole 19 which opens into a groove in the valve housing 12.

Further, said intermediate chamber is in connection with a servo motor 25 of diaphragm type secured in the frame of the vehicle. Said connection is formed by a channel in the valve housing 12 and has at its outer portion a nipple 26 for an air conduit 27 to the servo motor 25.

Upon pressing the valve rod 14 inwardly by means of the pedal movement and through the intermediate members according to the above, the inner end of the valve rod 14 will, during the first portion of its displacement and against the action of the compression spring 13, be brought into engagement with the sealing washer 18. The outlet hole 19 from the intermediate chamber having a connection with the servo motor 25 will then become closed. Upon further displacement of the valve rod 14 inwardly the counter pressure on the sealing washer 18 will be overcome and the sealing effect of the sealing washer will be broken so that air from the air pressure container 24 will flow into the intermediate chamber to flow further to the servo motor 25.

The servo motor is of the two-chamber type which in a known manner has the chambers separated by a diaphragm 29 in a casing 28 formed by two halves. The diaphragm is at its outer edge sealingly secured between the casing halves and in its central portion the diaphragm is provided to be actuated by a compression spring 30 provided in one of the chambers and being actuated through the medium of pressure plate 31 so that the diaphragm 29 in the neutral position of the servo motor 25 is bent inwardly into the other so called pressure chamber. The pressure plate 31 is rigidly connected with one end of a control rod 33 the other end of which being in a known manner pivotally connected to the disengagement arm 9.

Upon supply from the air pressure container 24 when the valve rod 14 has opened the connection to the intermediate chamber of the valve housing 12, air will flow into the pressuure chamber of the servo motor 25 through a connecting nipple 32 and will, under counter action of spring forces, compress the diaphragm 29 to a position in which it will bend inwardly into the so called spring chamber. The disengagement arm 9 will then through the control rod 33 at the same time be forced to carry out a pivotal movement around its journal centre in the frame of the vehicle and will by means of an arm 34 effect the disengagement of the transmission members between the engine of the vehicle and the gear box.

To sum up, the play in the connecting joint between the guide 8 and the disengagement arm 9 will assure that the driver practically does not need to apply any force for actuating the disengagement arm 9. By means of the pedal movement in the control system according to the invention the driver will control merely the valve function for engagement of the servo motor 25 which later on will carry out the required disengagement work. Neither the play in the connecting joint between the guide 8 and the disengagement arm 9, nor the play for the guide pin 15 in the valve rod 14 which later play is greater than the first mentioned, will upon servo action for the control system, be taken up before engagement of the servo motor 25.

If on the contrary the servo action for some reason should fail, the play between the guide 8 and the disengagement arm 9 will upon the first part of the pedal movement be taken up, and thereafter the driver will, by further depression of the clutch pedal 1, manually establish disengagement through the said mechanical intermediate members.

The return movement of the clutch function for engagement of the transmission members will be effected in a known manner under the influence of clutch springs, said intermediate members from the pedal 1 to the disengagement arm 9 will then be individually returned to the starting position of their respective springs.

Upon the returning movement of the pedal 1 as well as upon its depression the play in the connecting joint between the guide 8 and the disengagement arm 9 will balance the movement of the last mentioned one as a function of the pedal travel. Upon the first portion of the returning movement, the valve rod 14 will leave the sealing washer 18 and take up the so called play in the above mentioned connecting joint, so that the outlet channel or hole 19 from the intermediate chamber in the valve housing 12 will be opened. The air pressure will then sink in the servo motor 25 and the disengagement arm 9 will under the influence of the clutch springs be brought to perform a returning movement. The play in the connecting joint will then again return to a position where the outlet channel or hole in the valve rod 14 is closed. In such a manner it is possible in both pedal directions to obtain a soft and well balanced clutch function which is ended by pressing the sealing washer 18 against the abutment in the valve housing 12 and breaking the connection between the air pressure container 24 and the servo motor 25.

When a hydraulic type of transmission is utilized for transmitting the pedal movement to the two-way valve according to the modified embodiment illustrated in FIG. 2 a control rod 35 for a main cylinder 36 is hingedly connected to the pedal arm 2. To the main cylinder 36 is in a manner known per se connected an oil supply container 37. The pressure change in the main cylinder 36 as a result of the pedal movement will be transmitted through a conduit 38 to a working cylinder 39 which is shown in section in FIG. 6. A piston 41 which is displaceably mounted in the casing 40 for the working cylinder 39 will be moved axially in correspondance to the pressure change and resistant forces. In the end of the piston 41 facing from the pressure inlet is formed a seat for a displaceably mounted control rod 42 the outer fork-shaped portion of which being secured to the disengagement arm 9 in a manner described above for the guide 8. The control rod 42 is further at its outer end formed with two ears 43, to which the two-way valve 7 with a screw connection 44 is rigidly secured. The function of the guide pin 10 of the FIG. 1 embodiment is, for the hydraulic transmission embodiment of FIG. 2 replaced by a pin 45 formed with a head for cooperation with the valve rod 14 so that piston displacements in the working cylinder 39 due to the pedal movements will be directly transmitted to the two-way valve 7. The control system, upon hydraulic transmission of the pedal movements, will function in the same way as for the mechanical transmission of the pedal movement as described above.

As will be seen from FIGS. 5 and 6 in the control system according to the invention, the required auxiliary means i.e. the working cylinder 39 to which is attached the control valve 7, and servo motor 25 are mounted on a common bracket 46 to form a compact unit. This unit may in a simple manner be secured to the clutch housing or to any other suitable place in the frame of the vehicle and with direct connection to the disengagement arm 9.

The combination according to the invention is not limited to the manner of transmitting the pedal movements to the two-way valve 7, nor is the invention limited to the embodiment of the two-way valve 7 as shown. Members incorporated in the control system according to the invention may be varied in many respects and therefore it is possible to include several more alternative combinations than the above described within the scope of the invention.

What I claim is:

1. In a control system for actuating the clutch component on a motor vehicle by means of a clutch pedal, the combination comprising a disengagement arm correlated to the clutch mechanism, a pneumatic servo motor including a control rod connected to said clutch disengagement arm, a two-way servo valve for controlling air flow to and from said servo motor, said servo valve including a housing and a valve rod located within and movable relative to said housing for actuating the servo valving, a hydraulic transmission device including a main cylinder having a piston actuated by movement of the clutch pedal and a working cylinder connected to said main cylinder by a hydraulic transmission conduit, said working cylinder including a piston and a control rod actuated by the piston, a bracket-like support to which said servo motor and said working cylinder are secured to establish a compact unit and which is attached as a unit to the frame of the motor vehicle, means securing said servo housing to said control rod of said working cylinder, and means providing a lost-motion connection between said control rod of said working cylinder and said disengagament arm, said lost-motion connection including a pin for contacting said valve rod of said servo valve and effecting a valving action of said servo valve prior to utilization of all of the lost motion in said connection upon actuation of the clutch pedal.

2. A clutch control system as defined in claim 1 wherein said valve rod of said two-way servo valve is displaceably journalled in one end wall of said valve housing, said valve rod being merely actuated under the influence of relative movement between said disengagement arm and said working cylinder whereby the play in said lost-motion connection will balance the movements of said disengagement arm as a function of the travel of the clutch pedal.

3. A clutch control system as defined in claim 1 and which further includes means for adjusting the clutch pedal power as desired from 3 kg., which power corresponds to the required power for overcoming the engagement of said two-way valve, and wherein return movement of the clutch pedal to its starting position is safely obtained by spring means within said servo valve and a spring connected between the clutch pedal and a fixed point on the vehicle.

4. A clutch control system as defined in claim 1 wherein, in the event of failure of the servo function, disengagement of the clutch can be effected purely manually by means of the transmission members of the pedal movement to said disengagement arm.

References Cited
UNITED STATES PATENTS

| | | | |
|---|---|---|---|
| 3,083,804 | 4/1963 | Bland et al. | 192—91 |
| 3,195,417 | 7/1965 | Hager et al. | 192—91 |
| 3,292,751 | 12/1966 | McRay et al. | 192—91 |
| 3,307,667 | 3/1967 | Maurice | 192—91 |

BENJAMIN W. WYCHE III, *Primary Examiner.*

U.S. Cl. X.R.

91—460